No. 829,704. PATENTED AUG. 28, 1906.
B. D. EMANUEL.
CONTENTS INDICATOR FOR RECEPTACLES.
APPLICATION FILED SEPT. 7, 1905.
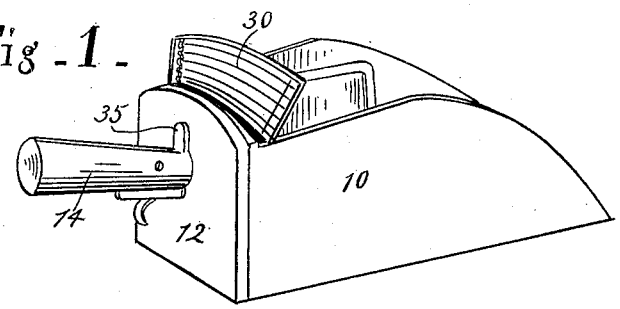
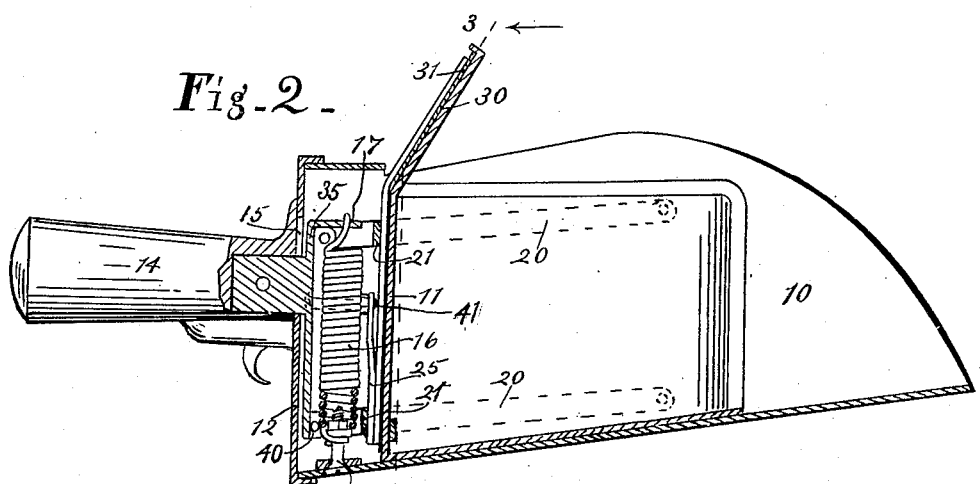
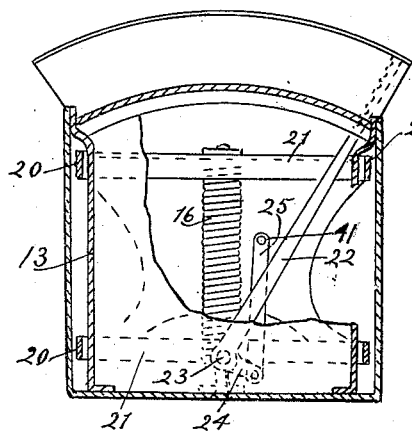
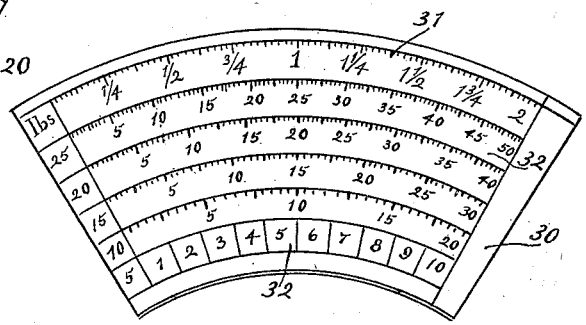
Inventor
Benjamin D. Emanuel.
Witnesses

UNITED STATES PATENT OFFICE.

BENJAMIN D. EMANUEL, OF ANDERSON, INDIANA, ASSIGNOR TO THE ANDERSON TOOL COMPANY, OF ANDERSON, INDIANA, A CORPORATION OF INDIANA.

CONTENTS-INDICATOR FOR RECEPTACLES.

No. 829,704.        Specification of Letters Patent.        Patented Aug. 28, 1906.

Application filed September 7, 1905. Serial No. 277,411.

*To all whom it may concern:*

Be it known that I, BENJAMIN D. EMANUEL, of Anderson, county of Madison, and State of Indiana, have invented a certain new and useful Contents-Indicator for Receptacles; and I do hereby declare that the following is a full, clear, and exact description thereof, reference being had to the accompanying drawings, in which like numerals refer to like parts.

The object of this invention is to provide in combination with a scoop, vessel, or other receptacle means for indicating the value of the contents of the receptacle and also the value of any portion discharged or removed therefrom.

To that end in the drawings I have shown in combination with an ordinary grocer's scoop a handle therefor with reference to which the scoop is vertically movable, and therefore tending to support the scoop in its upper position and an indicator actuated by the downward movement of the scoop that moves along a scale-plate having on it a weight-scale and also combined therewith a series of value-scales for determining the value of the contents of the scoop at various prices per pound.

The general nature of the invention will be understood from the accompanying drawings and the following description and claim.

In the drawings, Figure 1 is a perspective view of the scoop in its unused condition. Fig. 2 is a central vertical section through the scoop and the handle connection, parts being shown in dotted lines and parts broken away. Fig. 3 is a transverse section on the line 3 3 of Fig. 2. Fig. 4 is a diagram of the scales.

I have shown herein a device in many particulars the same as that shown in Letters Patent granted to Arthur L. Swank for a contents-indicator for receptacles, on December 12, 1905, Nos. 807,333 and 807,334. I have not shown herein some of the details which have no necessary relation to my invention or improvement. My invention may be used in connection with many constructions of weighing-scoops and similar devices besides that herein shown.

The general construction of the device herein shown consists of a scoop or receptacle 10 for receiving sugar or any other article, like an ordinary grocer's scoop. It has at the rear side a wall 11 and back of that a vertical wall 12, so that there is a chamber between said walls 11 and 12 adjacent the receptacle.

From the wall 11 walls 13 extend forwardly parallel with and near the outer side wall of the scoop 10, as is shown in Fig. 3, so that there is a chamber between said wall 13 and the outer wall of the scoop.

The handle 14 extends into the chamber at the rear side of the scoop through the vertical slot 15 in the vertical wall 12. A vertical plate 35 is secured to the inner end of the handle and forms practically a part thereof. Therefore the receptacle is vertically movable relatively to the handle. The receptacle is supported on the handle or plate 15 thereof by the spring 16, which is secured at its upper end to an upper arm 17, projecting from the plate 15, and at its lower end is connected by a screw 18 with the bottom of the scoop, or rather the chamber at the rear thereof. This spring holds the scoop in its uppermost position. The scoop is held in a substantially horizontal position with reference to the horizontal handle by means of bars 20, a pair of which is located at each side of the scoop, one above and one below, said bars extending into the chambers between the walls 13 and the outer walls of the scoop and being pivoted at their front ends to the side of the scoop about midway of the length of the scoop and being pivoted at their rear ends to the upper and lower ends, respectively, of the plate 15 of the handle. The upper pair of bars are secured together in a single frame by a transverse bar 21 and the lower pair of bars 20 are similarly secured together, so that there is an upper and also a lower frame pivoted at the rear ends thereof by pivots 40 to the upper and lower parts of the plate 15 and at their forward ends to the sides of the receptacle.

An indicator 22 is fulcrumed at 23 on the wall 11 at the rear side of the scoop centrally and near the lower part thereof. It has an arm 24, extending from the fulcrumed portion thereof at substantially a right angle to the body of the indicator, and a vertical connecting-bar 25 is pivoted at its lower end to said frame 24 and at its upper end to the pivot 41 on the plate 15, connected with the handle. Consequently downward movement of the scoop relatively to the handle will move the indicator to the left, as shown in Fig. 3. When the receptacle is discharged of its contents, the spring will return the scoop to its upper position and cause the indicator to move back to its normal position, as shown in Fig. 3.

On the scoop suitable scale-graduations are provided along the path of the indicator that indicate the extent of downward movement of the scoop. A scale-plate 30 for this purpose is provided upon the upper end of the wall 11 at the rear side of the scoop. The scale-plate may be a continuation of said wall 11 or added thereto. It is preferably inclined toward the front of the scoop, as shown in Fig. 2, so that the face of the scale-plate will directly face the eyes of a person using the scoop and enable him readily to see the numerals on the scale-plate. The upper end of the indicator is bent slightly, so as to move along the scale-plate rather closely.

On the scale-plate I place a weight-scale 31, extending from left to right transversely of the scoop and handle, and therefore readily seen by a person using the scoop. A two-pound weight scale is shown in Fig. 4 with the letters "Lbs." at the left of the row of graduations. Substantially parallel with the weight-scale I provide value-scales 32. These may be in any desired number. In Fig. 4 I have shown the values of the contents of the scoop at the prices of five, ten, fifteen, twenty, and twenty-five cents per pound. Other prices per pound may be employed and the value-scales may be used without the weight-scales, if desired. Therefore when the grocer takes up a scoop of sugar or other material valued at ten cents per pound he can tell exactly the value of the contents of the scoop. If a person wants fifteen cents' worth of sugar, he can fill the scoop and take out enough so that the indicator will be in line with the fifteen-cent numeral on the value-scale opposite ten cents per pound. If coffee at twenty-five cents per pound is being scooped, it will indicate the value of each scoopful and enable the grocer readily to sell thirty cents' worth without taking it to stationary scales to determine. The weight-scale is graduated to ounces and the value-scales to cents.

This device will also indicate to the user the value or weight, or both, of the material discharged or removed from the scoop and in that way be of great value to the grocer. To illustrate, if a person desire fifteen cents' worth of an article that sells at twenty cents per pound the grocer scoops up from the barrel or box more than the amount so that the indicator, say, would point to twenty-five cents' worth. He then shakes enough of the material out of the scoop into a bag for the purchaser to cause the indicator to move down to ten cents' worth on the twenty-cents-per-pound scale. Since there was twenty-five cents' worth in the scoop before the grocer began to discharge the contents and he has discharged all but ten cents' worth thereof, the bag for the purchaser contains the fifteen cents' worth desired. In this way the device can be used to indicate data relative to the contents discharged or removed from the scoop, and this is a practical way for the grocer to use the scoop.

What I claim as my invention, and desire to secure by Letters Patent, is—

The combination of a receptacle, a handle therefor with reference to which the receptacle is vertically movable, an indicator pivotally mounted on the receptacle so as to be transversely movable, means connected with the handle whereby the indicator will be actuated by the movement of the receptacle relative to the handle, a transversely-extending scale-plate along which the indicator moves and with a scale thereon arranged to indicate the value of the contents of the receptacle at varying prices per pound.

In witness whereof I have hereunto affixed my signature in the presence of the witnesses herein named.

BENJAMIN D. EMANUEL.

Witnesses:
CARRIE FLINN,
NELLIE ALLEMONG.